US007447306B1

(12) United States Patent
Barth

(10) Patent No.: US 7,447,306 B1
(45) Date of Patent: Nov. 4, 2008

(54) SIGNALING DEVICE AND SYSTEM

(76) Inventor: Ivan Barth, 99 Dean Rd., Mendham, NJ (US) 07945-1624

(*) Notice: Subject to any disclaimer, the term of this patent is extended or adjusted under 35 U.S.C. 154(b) by 757 days.

(21) Appl. No.: 11/158,434

(22) Filed: Jun. 22, 2005

(51) Int. Cl.
*H04M 1/00* (2006.01)

(52) U.S. Cl. ................................................ 379/399.01

(58) Field of Classification Search ............... 379/90.01
See application file for complete search history.

(56) References Cited

U.S. PATENT DOCUMENTS 5,870,466 A * 2/1999 Koenig et al. .......... 379/399.01

* cited by examiner

*Primary Examiner*—Ramnandan Singh
(74) *Attorney, Agent, or Firm*—W. Patrick Quast

(57) ABSTRACT

An electronic signaling device and a loop system incorporating at least one of the devices is described. The device is powered by the loop current and voltage and includes circuitry which enables it to function both in the mode where loop current is interrupted and when it is not. Each device has its own unique ID which is interrogated by the circuitry and which includes further circuitry for interrupting the loop current so that the unique ID can be transmitted to a remote location. Circuitry is provided to determine whether or not other loop activity is taking place before the device transmits its ID. Pause circuitry is provided to create distinguishable intervals between each digit of the ID and between each, successive transmission of a complete ID. Shut down circuitry is provided to return the device to its quiescent state after it has transmitted its ID or when an anomaly occurs.

9 Claims, 6 Drawing Sheets

Fig. 3A

| | Quan. | Value | Units | Value | Units | Value | Units | Description | Manufacturer | Part # |
|---|---|---|---|---|---|---|---|---|---|---|
| U1 | 1 | 700 | V | 100 | mA | 44 | kHz | High Voltage Switching Regulator | ON Semiconductor | NCP1050P44 |
| U2 | 1 | | | | | | | 14-Bit Binary Counter & Oscillator | ON Semiconductor | MC14060BCP |
| U3 | 1 | | | | | | | Quad R-S CMOS NOR Latches | ON Semiconductor | MC14043BCP |
| U4 | 1 | | | | | | | 7-Stage Ripple Counter | ON Semiconductor | MC14024BCP |
| U5, 6 | 2 | | | | | | | Dual 1-of-4 Analog Mux/Demux | ON Semiconductor | MC14052BCP |
| U7, 8 | 2 | | | | | | | Presettable 4-bit Down Counter | ON Semiconductor | MC14526BCP |
| U9 | 1 | | | | | | | Quad OR CMOS Gates | ON Semiconductor | MC14071BCP |
| U10 | 1 | | | | | | | Quad AND CMOS Gates | ON Semiconductor | MC14081BCP |
| U11, 12 | 2 | | | | | | | Hex Schmitt Trigger, Incr Hyst Volt | ON Semiconductor | MC14106BCP |
| U13, 14 | 2 | 400 | V | 0.5 | A | 5 | mA | Relay, PhotoMOS | Aromat | AQZ404 |
| | | | | | | | | | | |
| D1 | 1 | 5.6 | V | 5 | W | 5 | % | Diode, Zener | ON Semiconductor | 1N5339B |
| D2, 7-18 | 13 | 1 | A | 600 | V | | | Diode, General Purpose | ON Semiconductor | 1N4005 |
| D3, 4 | 2 | 1 | A | 600 | V | | | Diode, UltraFast | ON Semiconductor | MUR160 |
| D5, 6 | 2 | 5.1 | V | 5 | W | 5 | % | Diode, Zener | ON Semiconductor | 1N5338B |
| D19, 20 | 2 | 160 | V | 1500 | W | 1 | ms | Transient Voltage Suppressor | ON Semiconductor | 1N6300A / 1.5KE160A |
| | | | | | | | | | | |
| LED1 | 1 | 10 | mm | 2500 | mcd | 20 | mA | LED, Red, Super-Bright, 660 nm | MultiComp | MCL-813SRC-E |
| | | | | | | | | | | |
| Q1 | 1 | 70 | V | 50 | mA | 150 | mW | Phototransistor | Vishay / Telefunken | BPV11 |
| | | | | | | | | | | |
| SCR1 | 1 | 200 | V | 4 | A | | | Thyristor (SCR), sensitive gate | ON Semiconductor | C106B |
| | | | | | | | | | | |
| C1 | 1 | 4700 | uF | 10 | V | +/- 20 | % | Capacitor, Aluminum Electrolytic | Vishay / Beyschlag Centralab | 2222 118 14472 |
| C2 | 1 | 10 | uF | 200 | V | +/- 20 | % | Capacitor, Aluminum Electrolytic | Vishay / Beyschlag Centralab | 2222 118 90543 |
| C3, 4 | 2 | 1 | uF | 50 | V | +/- 10 | % | Capacitor, Ceramic, Multilayer, X7R | MultiComp | R30W105K1HL5L |
| C5 | 1 | 0.068 | uF | 100 | V | +/- 5 | % | Capacitor, Conf Coat, Ultra Stable | Kemet | C340C473J1G5CA |
| C6, 9-19 | 12 | 0.1 | uF | 50 | V | +/- 10 | % | Capacitor, Ceramic, Multilayer, X7R | MultiComp | R20W104K1HL5L |
| C7 | 1 | 47 | uF | 40 | V | +/- 20 | % | Capacitor, Aluminum Electrolytic | Vishay / Beyschlag Centralab | 2222 118 37479 |
| C8 | 1 | 3.3 | uF | 50 | V | +/- 20 | % | Capacitor, Ceramic, Multilayer, Y5V | Waber | M60U6R8M50 |
| | | | | | | | | | | |
| R1 | 1 | 30 | Ohm | 1 | W | 1 | % | Resistor, Power Metal Film | MultiComp | 5073NW36R00J |
| R2 | 1 | 560 | Ohm | 1/8 | W | 1 | % | Resistor, Precision Metal Film | MultiComp | MFR1/8W-1%-560R |
| R3 | 1 | 1 | kOhm | 1/8 | W | 1 | % | Resistor, Precision Metal Film | MultiComp | MFR1/8W-1%-1K |
| R4 | 1 | 200 | Ohm | 1/2 | W | 1 | % | Resistor, Precision Metal Film | MultiComp | MFR1/2W-1%-200R |
| R5 | 1 | 165 | kOhm | 1/8 | W | 1 | % | Resistor, Precision Metal Film | Vishay | RN55D 226K< 1% |
| R6,8-14,16,17,19 | 11 | 100 | kOhm | 1/8 | W | 1 | % | Resistor, Precision Metal Film | MultiComp | MFR1/8W-1%-100K |
| R7 | 1 | 1 | MOhm | 1/8 | W | 1 | % | Resistor, Precision Metal Film | MultiComp | MFR1/8W-1%-1M |
| R15 | 1 | 330 | kOhm | 1/8 | W | 1 | % | Resistor, Precision Metal Film | MultiComp | MFR1/8W-1%-330K |
| R18 | 1 | 220 | kOhm | 1/8 | W | 1 | % | Resistor, Precision Metal Film | MultiComp | MFR1/8W-1%-220K |
| R20 | 1 | 100 | Ohm | 1/8 | W | 1 | % | Resistor, Precision Metal Film | MultiComp | MFR1/8W-1%-100R |
| R21 | 1 | 2.7 | kOhm | 1/8 | W | 1 | % | Resistor, Precision Metal Film | MultiComp | MFR1/8W-1%-2K7 |
| R22 | 1 | 25 | kOhm | 1/2 | W | 10 | % | Potentiometer, Cermet, PCB mount, 25 turn | Bourns, Inc. | 3296Y-1-253 |

Fig. 3B

| | Quan. | Value | Units | Value | Units | Value | Units | Description | Manufacturer | Part # |
|---|---|---|---|---|---|---|---|---|---|---|
| L1 | 1 | 680 | uH | 0.51 | Ohm | 0.67 | A | Choke, Axial Lead Power | Coilcraft | PCH-45-684 |
| SP1 - 4 | 0.04 | 0.125 | " H | 0.171 | " ID | 0.25 | OD | Spacer, #8 clr, Nylon, round, 100 pak | Keystone Electronics Corp. | 891 |
| SP5 - 8 | 0.04 | 0.5 | " H | 0.171 | " ID | 0.25 | OD | Spacer, #8 clr, Nylon, round, 100 pak | Keystone Electronics Corp. | 894 |
| HD1 | 0.05 | 0.318 | " Pin | 0.125 | " Tail | 40 | pos | Header, Single Row, 30u Gold | Tyco Electronics / Alcoswitch | 4-102976-0 |
| PS1 | 1 | 0.1 | " CtC | 0.2 | " H | 2 | pos | Post Shunt, 30u Gold | Framatome Connectors (FCI) | 68786-202 |
| W1 - 4 | 0.04 | 16 | ga | 600 | V | 105 | C | Wire, hook-up, Type TEW, red | Belden | 8917-100-2 |
| W5 | 0.01 | 16 | ga | 600 | V | 105 | C | Wire, hook-up, Type TEW, white | Belden | 8917-100-9 |
| SL1, 2 | 0.02 | 22-16 | ga | 6 | # stud | | | Terminal, Solderless, Fork, Uninsulated, 100 pak | Thomas & Betts | A18-6F |
| SL3, 4, 5 | 0.03 | 22-16 | ga | 8 | # stud | | | Terminal, Solderless, Fork, Uninsulated, 100 pak | Thomas & Betts | A18-8F |
| FR1 | 0.01 | | | | | | | Spray, Flux Remover and Cleaner | GC Electronics | 22-271 |
| S1 - 4 | 4 | 10 | pos. | | | | | Switch, DIP, Rotary, BCD | ITT Indust / Cannon | CRD10RM0CK |
| S5 | 1 | 5 | mA | 1.1 | A | 125 | VDC | Switch Assembly, Jumbo Mushroom, Deep, Red | IDEC | ABFD401N-R |
| CB1 | 0 | | | | | | | Contact Block, NC | IDEC | BST-001 |
| CB2 | 0 | | | | | | | Contact Block, Dummy | IDEC | BST-D |
| FH1, 2 | 2 | 5 | mm | 20 | mm | | | Fuse Holder, 5 X 20 mm, Type FAS | Schurter | 0031.3501 |
| F1, 2 | 2 | 250 | mA | 5 | mm | 20 | mm | Fuse, Fast Acting, 235 series | Littlefuse | 235.250 |

SIGNALING DEVICE AND SYSTEM

FIELD OF THE INVENTION

This invention relates to signaling devices and a system employing such devices and more particularly to signal box type systems of including devices of a non-interfering design.

BACKGROUND

For over 100 years the fire and emergency alarm equipment industries have used a "telegraph" signaling scheme to give the public a means for alerting responders to emergency situations. These are largely electro-mechanical devices. These sending mechanisms have been made by companies such as Gamewell, a division of Honeywell, Faraday, and the Peerless Company. During their many years of availability, these emergency signaling systems have become a familiar site in the form of fire alarm boxes on street corners, emergency alarm boxes in subway tunnels, etc. Unfortunately, because they are largely mechanical in nature, the sending mechanisms themselves require service. This is a significant expense, both in material and labor, especially since the sending units are used in large quantities.

Electronic replacements have been slow to replace these units because they typically require local power, which is not a convenient and reliable option. Augmenting local power reliability with a local rechargeable battery is also an unfavorable option because this battery will require replacement every three to five years. Alternately, bringing reliable power to each unit location from the master alarm panel would require the addition of conductors, which is also viewed as prohibitive by potential end users. A solid state electronic replacement device that could operate entirely from the 100 milliamp DC loop current associated with the present system would likely fill a major void in the market. Such a system is the subject of the present invention.

In switching to a solid state replacement for existing electro-mechanical devices consideration must be given to at least the following:

a) the electronic replacement device must be electrically and operationally compatible with existing mechanisms, as well as additional electronic units within the loop.

b) The device must be powered entirely from the 100 milliamp DC loop current. It must not require any local power nor employ any local battery, regardless of type.

c) Protection from voltage and current surges must be incorporated.

d) The device must operate on loop current applied in either direction.

e) The device circuitry must be completely isolated from local ground.

f) Any switch contacts carrying the loop current must be field serviceable.

g) When the device is initially activated by the user, it must not immediately open the current loop. Instead, it must wait and watch the loop for activity (circuit openings) occurring at another device on the loop. This wait time must be approximately the time between ID repetitions, to truly ensure that another unit is not running.

h) If activity is present, the device must wait to send its ID after activity elsewhere ceases.

i) Once the replacement device begins to send its ID, it must ignore any further interruptions in the loop, as long as they are brief enough to maintain its operation.

j) For the purposes of "non-interference" sensing, a loop current greater than a first predetermined amount, for example, approximately 70 mA, must be considered closed, while a loop current less than a second predetermined amount, for example, approximately 17 mA, must be considered open. This approximates the hysteresis of the relays that are typically employed to monitor the current loops.

k) Once activated, a single device emulating a closed loop must result in a current greater than yet another predetermined amount, for example, 90 mA. A single device emulating an open loop must result in a current less than a further predetermined amount, for example, 2 mA. When switching from closed loop to open loop emulation, a brief moment of zero loop current is desirable to ensure release of the loop monitoring relay (for example K1 in FIG. 1), regardless of its coil sensitivity.

l) The existing mechanisms require a replacement cam to change their ID. The setting or altering of the ID of the electronic replacement must be configurable in the field with only a few hand tools. Access to changing the ID must require at least one hand tool, precluding access to the public.

m) Once a unit is initially activated, repeated depressions of the initiating operator must not affect its operation until its transmission cycle is complete.

n) Upon completing its transmission, the unit must return the loop to its closed state and be ready for repeated use without requiring any maintenance such as winding, charging, manual reset, manual opening of the loop, etc.

o) The replacement device must provide visual feedback, such as an LED, to indicate to the user that his signal will be sent. For example, if loop current was not present when the user depressed the operator or if the operator mechanically malfunctioned, this LED must not illuminate.

p) Multiple units must be stackable and must activate from a single operator. This allows a single physical location to be part of multiple current loops while fully preserving each unit's individual features. This characteristic is useful in subway tunnels, where the loop monitoring equipment also switches off power to the third rail and where a single location must affect multiple sections of third rail.

q) The visual indication on the top device of a multiple device stack must illuminate only if all devices in the stack have confirmed their loop current and latched the depression of the operator.

r) Each device in a multiple device stack must latch the confirmation from the device below it, so that confirmations do not need to occur simultaneously to produce visual confirmation from the device at the top of the stack.

s) Confirmations must be passed up within a stack using optoelectronics. Electrical connection between loops is not permitted. Inductive coupling of a signal is also undesirable due to its susceptibility to electromagnetic interference.

t) The electronic replacement device must be compact and designed to fit in the existing outer housings originally designed to house their mechanical grandfathers.

u) The device must be no thicker than 0.75" in order to stack up to five high in the original outer housings.

SUMMARY OF THE INVENTION

Towards the accomplishment of these and other objects and advantages that will be apparent, there is provided an electronic signaling device for transmitting an ID unique to the signaling device when the signaling device is activated from a quiescent state to an active state. The signaling device is adapted for placement in a loop circuit wherein the loop circuit has a predetermined loop current and voltage. The loop circuit includes means for transmitting to a remote location an indication of the periodic interruption of the flow of the predetermined loop current in the loop circuit at least when the electronic signaling device is transmitting its unique ID. Since the periodic interruption of the flow of predetermined loop current is a function of the electronic signaling device's ID, the remote location, including means responsive to the indication, can identify the particular electronic signaling device resulting in the periodic interruption of the flow of the predetermined loop current.

The electronic signaling device comprises:

(a) an activation circuit means responsive to the activation of the electronic signaling device by an operator;

(b) a closed-loop emulation power supply circuit means for powering the electronic signaling device when there is no interruption of the loop current. The closed-loop emulation power supply circuit means is powered by the predetermined loop current and voltage;

(c) An open-loop emulation power supply circuit means for powering the electronic signaling device after the activation responsive circuit means is activated by an operator, and when there is an interruption of the loop current. The open-loop emulation power supply circuit means is powered by the predetermined loop current and voltage;

(d) An activity sensing circuit means for monitoring whether the interruption of the flow of the loop current is due to an activity occurring elsewhere in the loop and not the result of the activation of the electronic signaling device by an operator.

(e) A system clock circuit means responsive to the activity sensing circuit means whereby the system clock circuit means generates a start signal to initiate the transmission of the unique ID of the electronic signaling device after the activity sensing circuit means determines that the interruption of the flow of the loop current elsewhere in the loop has not occurred for a predetermined first period of time.

(f) Means are provided for setting the individual digits of the unique ID for the electronic signaling device. The unique ID comprises at least two individual digits of respective value.

(g) The invention includes circuit means adapted to interrogate the means for setting the unique ID to successively determine each of the at least two digits.

(h) A loop switching circuit means responsive to the circuit means adapted to interrogate are provided, whereby the loop circuit is sequentially opened and closed such that the loop current is interrupted or not, wherein the sequential opening and closing of the loop circuit is proportionally representative of the respective values of the at least two individual digits.

(i) There is a first pause circuit means adapted to introduce a first time interval between the successive determination of each of the at least two digits, whereby the respective value of each of the at least two digits can be distinguished by the remote location.

(j) There is a circuit shut down means adapted to respond to a determination that the electronic signaling device has ended the transmission of its unique ID, such that the circuit shut down means returns the electronic signaling device to the quiescent state.

The electronic signaling device of the present invention can further comprise a second pause circuit means adapted to determine when the electronic signaling device has ended transmitting its unique ID whereupon the second pause circuit means is further adapted to direct the circuit means adapted to interrogate to repeat the interrogation of the means for setting the unique ID at least one additional time.

The electronic signaling device of the present invention can further comprise second circuit shut down means which are adapted to return the electronic signaling device to the quiescent state after an extended time delay of predetermined length. This extended time delay is indicative of an abnormal event occurring in the electronic signaling device.

The electronic signaling device of the present invention can be part of a signaling system which comprises two or more signaling devices, at least one of which of the two or more signaling devices is the electronic signaling device. Each of the two or more signaling devices is adapted to transmit an ID unique to each such signaling device.

In certain situations, where various loops intersect in a certain location, the signaling system of the present invention can include at least two or more of the electronic signaling devices, which are physically stacked, one upon the other, and where each of the two or more electronic signaling devices is placed in a different, respective loop circuit, all of the loop circuits to be interrupted if one loop circuit is interrupted by its respective activated electronic signaling device. At least all of the stacked electronic signaling devices, above the bottom one in the stack, including the uppermost electronic signaling device in the stack, include a photo responsive electronic component. The uppermost electronic signaling device provides a visual indication of the interruption of the loop circuits through the cooperative interaction between the photo responsive electronic component means in each adjacent, stacked electronic signaling device.

BRIEF DESCRIPTION OF THE DRAWINGS

An understanding of the present invention, its objects, advantages, construction and operation can be had by consideration of the following specification including accompanying drawings which are described as follows:

FIG. 3A and FIG. 3B depict the parts list corresponding to the schematics of FIGS. 2A and 2B.

DESCRIPTION OF THE PREFERRED EMBODIMENT

Basic Alarm Loop Operation and Signaling Protocol

Figure 1:
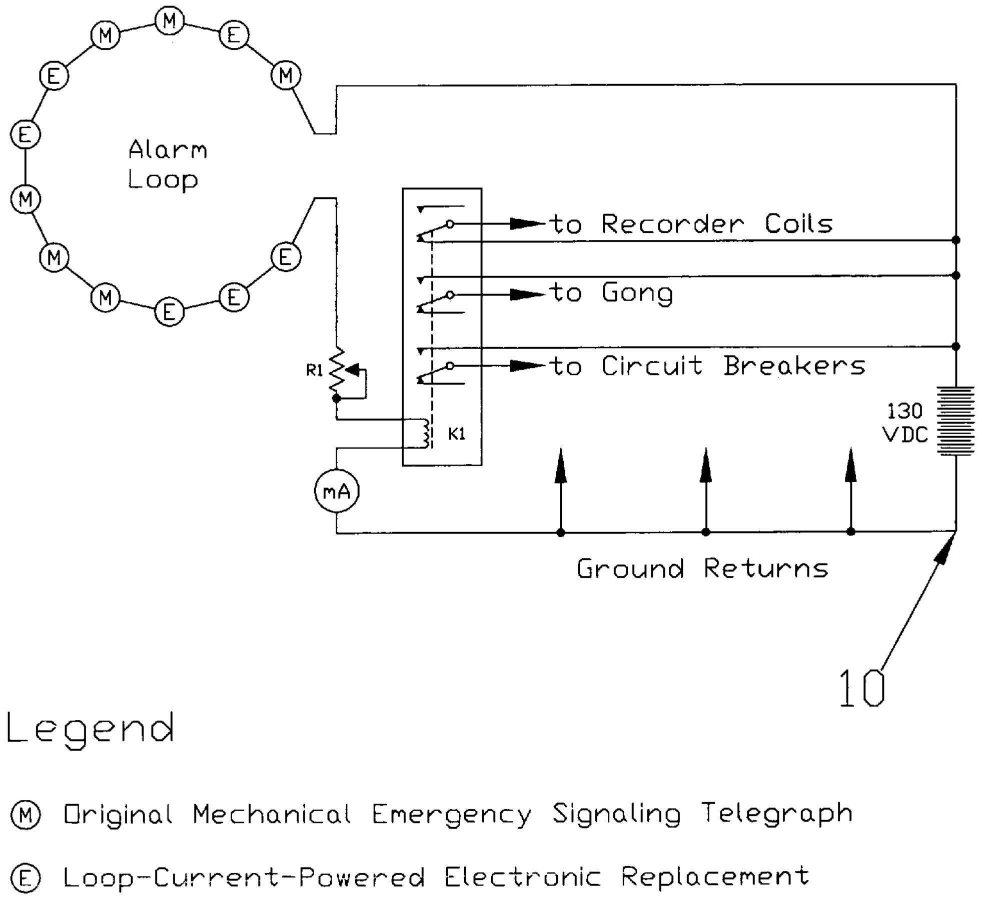
FIG. 1 is a simplified schematic of a signaling system employing the solid state, electronic signaling units of the present invention substituted for various prior art electromechanical units.

FIG. 1 is a simplified schematic of a prior art alarm system, employing a 100 milliampere loop design, modified to insert electronic replacements as required. In this figure, trouble free mechanical alarm telegraphs (represented by a circled M) remain in the alarm loop. Troublesome ones have been replaced by the solid state, electronic replacements (represented by a circled E) of the present invention. They are connected serially. The respective electrical terminals used to connect each in the loop are identified W1 and W4. With all telegraphs in place, rheostat R1 is set for a reading of 100 milliamperes on milliammeter mA. The equivalent resistance in the alarm loop thus, for the 130 VDC source shown, is 1300 ohms. Relay K1 is shown in the energized position, which is actually its normal state because all alarm telegraphs normally pass loop current. Note from the relay's contact configuration that each interruption of the loop current rings the gong on the alarm panel at the central station and provides trip current to third rail circuit breakers, where applicable. Similarly, each restoration of the loop current energizes the paper tape recorder release coils.

When activated by a user in a known fashion, a sending telegraph initially opens the loop current to indicate an emergency situation and then closes and reopens it repeatedly to send the ID of the reporting location. ID digits are sent by closing and opening the loop once to send a one, twice to send a two, three times to send a three, etc. An ID does not contain the number zero. Individual digits are separated by a longer break (an open loop condition) in the string of pulses. The ID is repeated a set number of times, typically four, to give respondents at the central station listening to the gong as well as the paper tape recorder multiple chances to record it accurately. Breaks between ID repetitions are longer than breaks between digits, to indicate the beginning and end of each repetition. The transmission ends with the current loop restored to the closed state.

Signaling systems of the type described herein typically include a non-interference feature which prevents a unit from operating if another unit in the loop is already running, thereby avoiding corruption of the first unit's transmitted ID. This is implemented as follows: When the device is initially activated by the user, it does not immediately open the current loop nor initiate the transmission of its ID. Instead, it waits and watches the loop for activity (circuit openings) occurring at another device on the loop. If this brief waiting period expires without any indication of activity elsewhere on the loop, the device begins to send its code. Older mechanisms permanently abort operation in the event of an open loop occurring at any time during their operational cycle. More recent versions send their ID after activity elsewhere on the loop ceases. The latter type are often not employed because with present designs maintenance personnel must rewind them following each activation or series of activations.

Activation (a) Initial Circuit Reaction

Figure 2A:
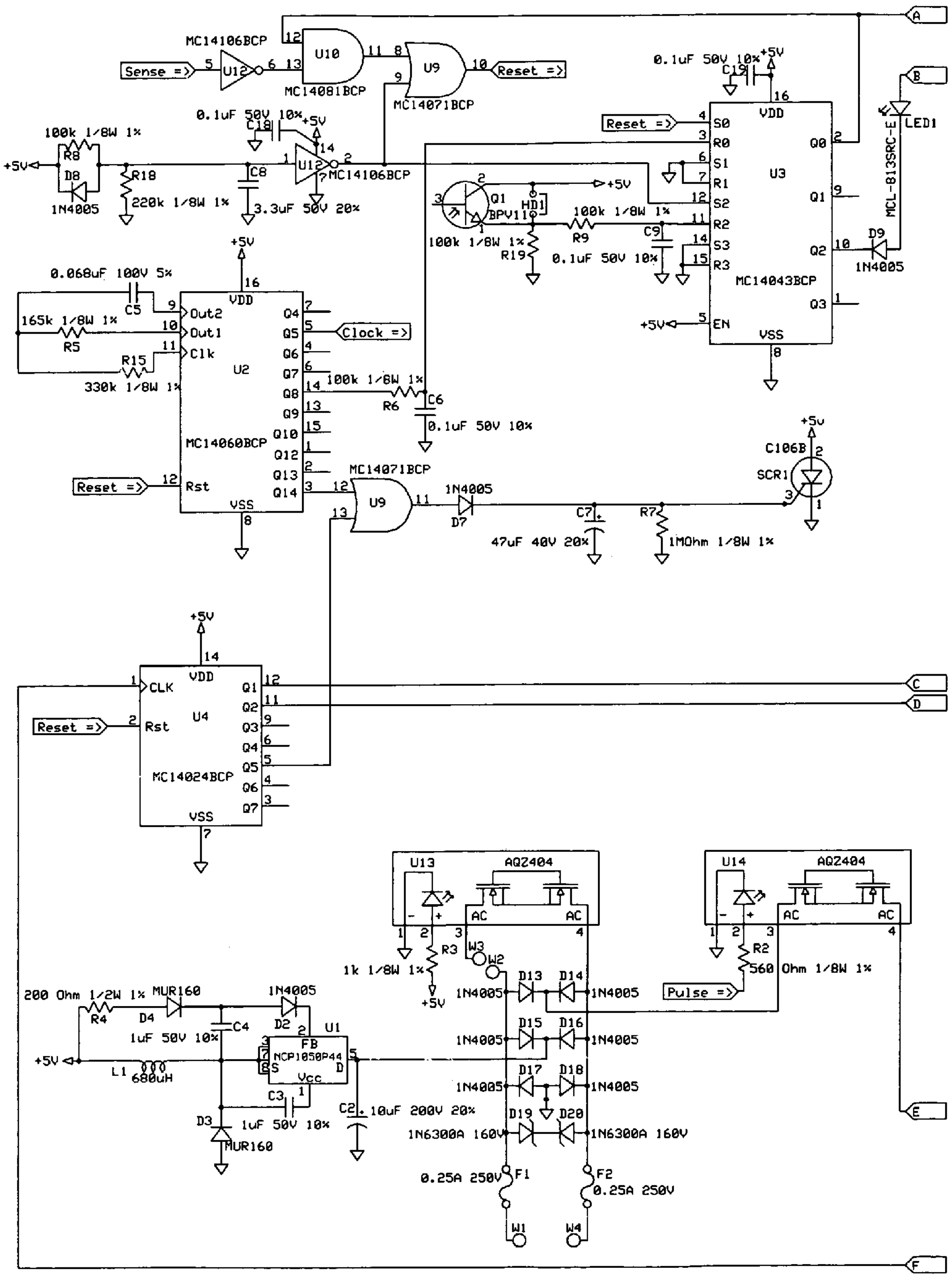
FIG. 2A is a detailed electronic schematic of a first portion of the electronic replacement device of the present invention.

Please refer to the bottom center of FIG. 2A. The electronic replacement device is inserted in the 100 mA series alarm loop in the same manner as its mechanical predecessor, using terminals W1 and W4. Fuses F1 and F2 limit any short circuit current to 250 milliamperes. MOSORBs, D19 and D20, high energy zener diodes, which operate as voltage clamping devices, limit the open circuit voltage to 160 volts of either polarity. Diodes, D13 through D18 allow the device to operate on loop current of either direction.

A normally closed mushroom pushbutton switch (not shown) (the initiating device) is connected across terminals W2 and W3. To initiate an alarm, an operator presses this pushbutton which opens the circuit and disconnects from the alarm loop the normally closed MOS channel of U13 (in effect, a normally closed, solid state relay). Current then flows through either D13 or D14, depending on the polarity presented at terminals W1 and W4, through the normally closed MOS channel of U14 (normally closed, solid state relay), through R1 and into C1 (See FIG. 2B). This continues for a fraction of a second until 5.6 volts develops across C1 and zener diode D1, at which point the current flows to ground through D1. This 5.6 volts, shown nominally in the schematic diagram as "5 v" supplies the DC voltage to the module components. The ground return of the circuit is completed through either D17 or D18, depending on the polarity presented at terminals W1 and W4. This ground is merely a common point for the negative-most points within a single electronic module. It is completely contained within a given electronic device and is isolated from local ground 10 (See FIG. 1). Access to it from the outside world can be prevented by the package enveloping the electronic module which is typically made from a suitable epoxy, potting compound.

The voltage developed across C1, supplies current through R3 (see FIG. 2A) to illumine the LED in U13 to thus open its MOS channel. This action latches open the short that is normally maintained across W1 and W4 by U13 in series with the normally closed, pushbutton switch. This effectively isolates any subsequent action of the mushroom pushbutton switch across terminals W2 and W3 from the circuit, until the module's supply voltage drops away at the end of its transmission cycle.

(b) The Non-Interfering Feature

At the beginning point in the cycle, the module must continue to emulate a short circuit or closed loop until it is determined whether or not another mechanism in the loop had been previously activated. The MOS channel of U14, is still closed so that loop current (nominally 100 mA, but actually somewhat lower, approximately 93 mA) continues to flow. U14 will remain closed until a logic high signal arrives on the "pulse" line to illuminate its internal LED.

Once the voltage is developed across C1, the clocking circuits (described later) will have started to run, while the other module electronics have become functional. Initially at power up, because of the time constant created by C8 and R8, flip flop U12, pin 1, sees a low logic level. This results in a high level at U12's output, pin 2, which creates a high logic level at the output, pin 10, or Reset line, of the OR gate, U9. This high level is provided to the set input S0 of a flip flop in U3. This results in a high level at the Q0 output of U3 which is latched at the high level until the flip flop is reset by a logic high at U3 R0. The Q0 output is tied back to AND gate U10 pin 12 so as to enable that gate and make it responsive to the inverted sense logic appearing at the output, pin 6, of inverting Schmidt trigger U12. The voltage input at U12, pin 1 continues increasing. The threshold of U12 is reached and the output at pin 2 goes to logic zero, thereby concluding the power up reset phase, all in a fraction of a second. From this point forward, the output of OR gate U9 is responsive only to the "sense" signal at U12, pin 5.

Again, the module watches the "sense" line (the juncture of D5 and D6) for activity elsewhere in the loop (i.e. the transmission from another telegraph in the loop). This "sense" signal, reflecting activity elsewhere in the loop, is developed as follows (see lower left corner of FIG. 2B): when the device is first activated, due to the voltage drop across R1, for 100 mA loop current, the potential at "E" is approximately 8.6 volts. Activity (openings) elsewhere in the alarm loop will cause the potential at "E" to switch from approximately 8.6 V to approximately 5.7 V. This causes the potential at the "sense" line to switch from approximately 3.5 V (logic high) to approximately 0.6 volts (logic low). This level shift is accomplished by D5, R21 and R22. The "sense" signal is processed by the inverting Schmitt trigger at U12 pin 5 (FIG. 2A, upper left), causing logic high outputs at the "reset" line, as long as flip flop U3-Q0 remains "set" (at the logic high level).

The lowest loop current that will activate K1 in FIG. 1 is 70 mA. The highest loop current that will cause this relay to deactivate is 17 mA. It is desirable for the module to interpret closed loop and open loop conditions consistently with these parameters. The value of R1 establishes the difference between the currents at which the "sense" line causes the Schmitt trigger to turn ON and OFF. R1=30 Ohms provides the required gap of 53 milliamps (70 mA ON threshold minus 17 mA OFF threshold). Prior to epoxy potting, potentiometer R22 is set so that the turn ON threshold is 70 milliAmps. Once encapsulated, R22 is inaccessible to the end user.

Again, if there is activity elsewhere in the loop, U9, pin 10, the reset output is tracking, inversely, the logic of the "sense" signal. U9, pin 10 is also fed to the reset input, pin 12, of clock U2. The presence of this signal will continually reset the clock whenever there is activity elsewhere in the loop. This keeps clock output Q8 at U2, pin 14, from going high so that no reset level is available to R0 of U3 when there is activity in the loop.

Alarm Transmission

Now, please refer to the bottom of FIG. 2A. Logic high signals on the "pulse" line cause the LED in U14 to light via R2. This opens the MOS channel in U14, (again, a normally closed solid state relay) causing the module to emulate an open loop. However, the module circuitry must continue to operate even though there is an open-loop emulation. When this occurs, current then flows through either D15 or D16, depending on the polarity presented at terminals W1 and W4, into C2 and the switching power supply built around high voltage switching regulator, U1. The voltage across C2 may reach the full open-circuit loop potential of 130 VDC. This supply continues to provide operating energy for the module, regardless of how long an open circuit may need to be emulated. This supply is designed to provide 5.1 volt output potential and draws only, approximately 1 mA during steady-state open-loop emulation. An important feature of the dual power supply configuration is the 0.5 volt difference between the 5.6 volt power supply, which is active during closed loop emulation and the 5.1 volt power supply, which is active during open loop emulation. The output filter capacitor common to both supplies, C1, is pre-charged to 5.6 volts by the closed loop emulation power supply. Each time the open loop emulation power supply comes on line, it momentarily draws almost no current, as C1 discharges from 5.6 volts to 5.1 volts. This ensures that any control relay (for example, K1 in FIG. 1) monitoring the alarm loop, no matter how sensitive to low current levels its coil may be, will always respond to each open-loop condition by releasing.

Please refer to the upper left corner of FIG. 2A. Module clocking is developed in U2, with R5 and C5 providing the necessary RC time constant. Some end users may be accustomed to different, especially slower, signaling speeds. Adjustable clocking speed may be accomplished by replacing fixed resistor R5 (165 k) with a series combination of a 150 k fixed resistor and a 50 k potentiometer. If employed, this potentiometer would remain accessible to the end user. It might be encapsulated in the epoxy potting compound in such a manner as to permit adjustment by the installer, but not the public. This means that its setting screw would be exposed on the same side as jumper JU1 (see below). Stage 5 of the 14-stage binary divider contained in U2 (U2-Q5) provides the "clock" signal for the entire module.

As, noted above, stage 8 of U2 (U2-Q8) sets flip-flop U3-Q0, ending the closed-loop, non-interference phase and beginning the transmit phase of the module's operation via line "A". Again, as stated above, up to this point, any logic low activity on the "sense" line would have reset U2 via pin 8 of U9, causing the timing parameters of U2 to restart from 0. After this point, any activity on the "sense" line is ignored due to the blocking effect of the AND gate at U10 pins 11, 12 and 13. R8 and C8 provide the RC time constant that correctly times power-up resets via pin 9 of U9. Stage 14 of U2 (U2-Q14) provides a watch-dog signal, occurring after 512 clock cycles, to SCR1 via pin 12 of U9, should U4 stage 5 fail to end the module's operation via pin 13 of U9. In either case, SCR1 terminates module operation as described in greater detail later.

Implementing an Individual Unit's Respective ID

Figure 2B:
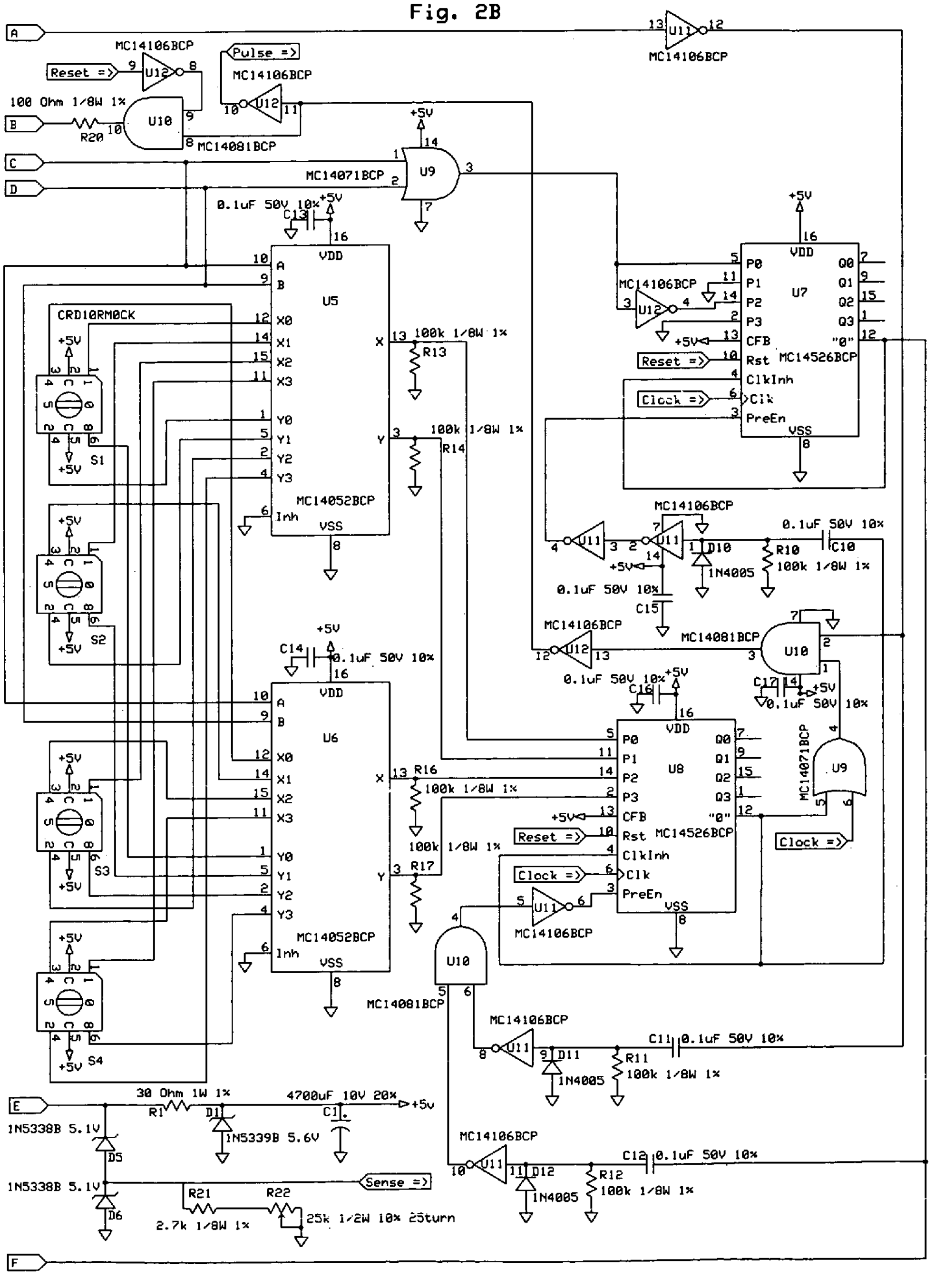
FIG. 2B is a detailed electronic schematic of a second portion of the electronic replacement device of the present invention with the interconnection between FIGS. 2A and 2B occurring at labeled terminals A, B, C, D, E and F.

Please refer to the right half of FIG. 2B. A logic high pulse at pin 3 of either pre-settable down counter U7 or U8 causes it to load the binary digit presented to it via pins 5, 11, 14 and 2. In the case of U8, this is the digit at the outputs of analog multiplexers U5 and U6. These multiplexers select from among the BCD outputs of rotary DIP switches, S1 through S4. S1 through S4 have been previously set by the installer, with S1 as the most significant digit and S4 the least significant digit. The use of analog multiplexers permits the use of only four pull-down resistors, R13, R14, R16 and R17, as opposed to sixteen pull-down resistors on all four outputs of all four BCD rotary switches, S1 through S4. In the case of U7, the preloaded digit is a predetermined duration of open-loop emulation whose length is measured in whole clock pulses. C10 with R10, C11 with R11 and C12 with R12 (FIG. 2B) each form a one-shot circuit used to provide a logic high pulse as a result of a low to high state change. The output of each one-shot is conditioned by an inverting Schmitt trigger. The circuitry is configured such that, as each counter completes its task, it triggers the operation of the other. U7 and U8 alternately provide an open-loop time duration and a series of pulses whose quantity is determined by the BCD digit preloaded into U8, respectively.

The completion of the transmission of each digit causes a clock transition to be delivered (via "F") to pin 1 of counter U4 (FIG. 2A), advancing the state of its outputs from 0. This advances the two digit binary state on its Q1 and Q2 outputs, thereby advancing the selection of the analog multiplexers U5 and U6 (FIG. 2B via "C" and "D") to the next BCD rotary switch, S1 through S4. Each time outputs Q1 and Q2 of U4 are at 0, a longer open-loop emulation period is loaded into U7 via U9 pin 3. This allows the open-loop duration between code cycles to be longer than the open-loop duration between code digits. Now, please refer to the left center of FIG. 2A. After the transmission of four complete code cycles, U4 output Q5 provides drive to SCR1 via pin 13 of U9. This ends module operation by discharging all operating voltage (+5 v) power from C1 and C2. D7 and C7 ensure that this task is completed reliably by maintaining energy to SCR1's gate even after all module operating energy has been depleted.

Multiple (Stacked) Unit Locations

Please refer to the upper right corner of FIG. 2A, the upper left corner of FIG. 2B and line "B". The circuitry surrounding LED1 is so configured as to ensure that a number of conditions must be met before it will light.

1) The module's contact block across W2 and W3 must have been activated (opened) while current was flowing in its alarm loop. The duration of the open must have been long enough to build sufficient voltage on C1 to operate the LED in U13.

2) The module's power up reset must be complete resulting in a logic low at U9, pin 9.

3) Prior to the resetting (via pin 3 of flip-flop U3-Q0, the loop the module is part of must have more than 70 mA flowing through it, yielding a logic high on the "sense" line.

When conditions 2 and 3 immediately above, are met, the "reset" line is low.

4) The "pulse" line must be low, meaning the module must be emulating a closed loop condition.

5) If jumper JU1 (not shown) is not in place on header HD1 (see FIG. 2A, upper right), the module below in a multiple stack location must have at some point lit its respective LED 1, activating local phototransistor Q1, after the completion of local power-up reset. The signal from Q1 is latched by flip-flop U3-Q2 and can only be released by an ensuing local power-up reset.

During module installation, single module locations must have jumper JU1 installed on header HD1, thus bypassing phototransistor Q1. Multiple module stacked locations must have JU1 installed on HD 1 on the bottom module only. Remaining modules on the stack must have JU1 removed from HD 1 and discarded, placing Q1 into operation in all but the bottom module.

The module and its solid epoxy case are designed so that the LED 1 in each module of a multiple module stack fits inside the module above it. Furthermore, the void the LED 1 fits in contains phototransistor Q1, thus exposing Q1 to any light emitted by LED 1 of the module below.

If modules are installed correctly and loop currents are flowing as needed, the above design parameters result in the following LED 1 behavior:

1) The LED 1 lights after a user depresses the initiating operator and the module completes its power-up reset.

2) If another emergency signaling telegraph in the loop (mechanical or electronic) is running, the LED 1 will flash off every time the other telegraph opens the loop.

3) If no other emergency telegraph is running, or once the other telegraph completes its cycle, the local electronic module begins to transmit its signal. During this time, the LED 1 also flashes off every time the local module opens the loop.

4) At the completion of the module's transmission cycle, the LED 1 extinguishes.

Short Circuit Protection

Some potential end users have expressed concern over the presence of 250 mA fuses F1 and F2. Their reservations pertain to the quantity and location of field units and the requirement to visit these locations in the event of a fault current in the alarm loop, rather than simply replacing a 10 A fuse in the master alarm panel. An ideal solution is to replace F1 and F2 with a dual polymeric positive temperature coefficient self-resetting fuse such as the Raychem TSM600-250-RA-2. Unfortunately, the trip time curves of this device do not meet the protection requirements of the Aromat AQZ404 form-B PhotoMOS relays employed in this design. To this inventor's knowledge, there is no heavier duty form-B (normally closed) PhotoMOS relay available at this time. Hence, once one becomes available, it may be employed in place of the AQZ404 relays, allowing self-resetting fuses to be substituted for standard fuses F1 and F2. In the mean time, a 150 mA or 200 mA fuse may be inserted in the current loop at the master alarm panel. Such a fuse would bear the normal 100 mA loop current, yet should open prior to the 250 mA fuses in the field units.

Photocoupled solid state relays, e.g., U13 and U14, are currently available in much heavier current ratings in form-A than in form-B. This inventor is currently pursuing an alternate design which employs a heavy form-A photocoupled solid state relay in place of U14. This requires the "Pulse" signal to be inverted, relative to the original design. This design does not contain U13 and the activation switch is instead connected directly to the logic in a manner that starts the "sense" phase of the module's operation. This allows the use of a dual polymeric positive temperature coefficient self-resetting fuse such as the Raychem TSM600-250-RA-2 in place of F1 and F2. This design remains powered up as long as power remains applied to the 100 mA current loop. The disadvantage of this design is that there is a permanent voltage drop of about 10 Volts across each unit. This limits the total number of electronic telegraphs in a given DC voltage loop.

Block Diagram Narrative

The component identifications hereinafter, such as U2, SCR1, S1-4, etc. are references to the same components depicted in FIGS. 2A, 2B, 3A and 3B. Please refer to the bottom center of the block diagram marked FIG. 4. The electronic replacement device is inserted in the 100 mA series alarm loop in the same manner as its mechanical grandfather, using terminals W1 and W4. Current and voltage surge protection is provided at the loop current connections. Common diode bridge rectification allows the device to operate on direct current in either direction or even alternating current. Under normal circumstances, i.e., no activations in the loop, the loop shunt and activation switch maintain a closed current loop circuit. Pressing the activation switch opens the short normally maintained across the bridge rectification, allowing the closed-loop emulation power supply to power up the module. The activity sense circuit allows resets to be generated by activity (openings) elsewhere in the loop. The loop switching circuit allows the module to send its numeric ID by sequentially opening and closing the current loop. Each time the loop is opened, the open-loop emulation power supply takes over the task of powering the module.

Figure 4:
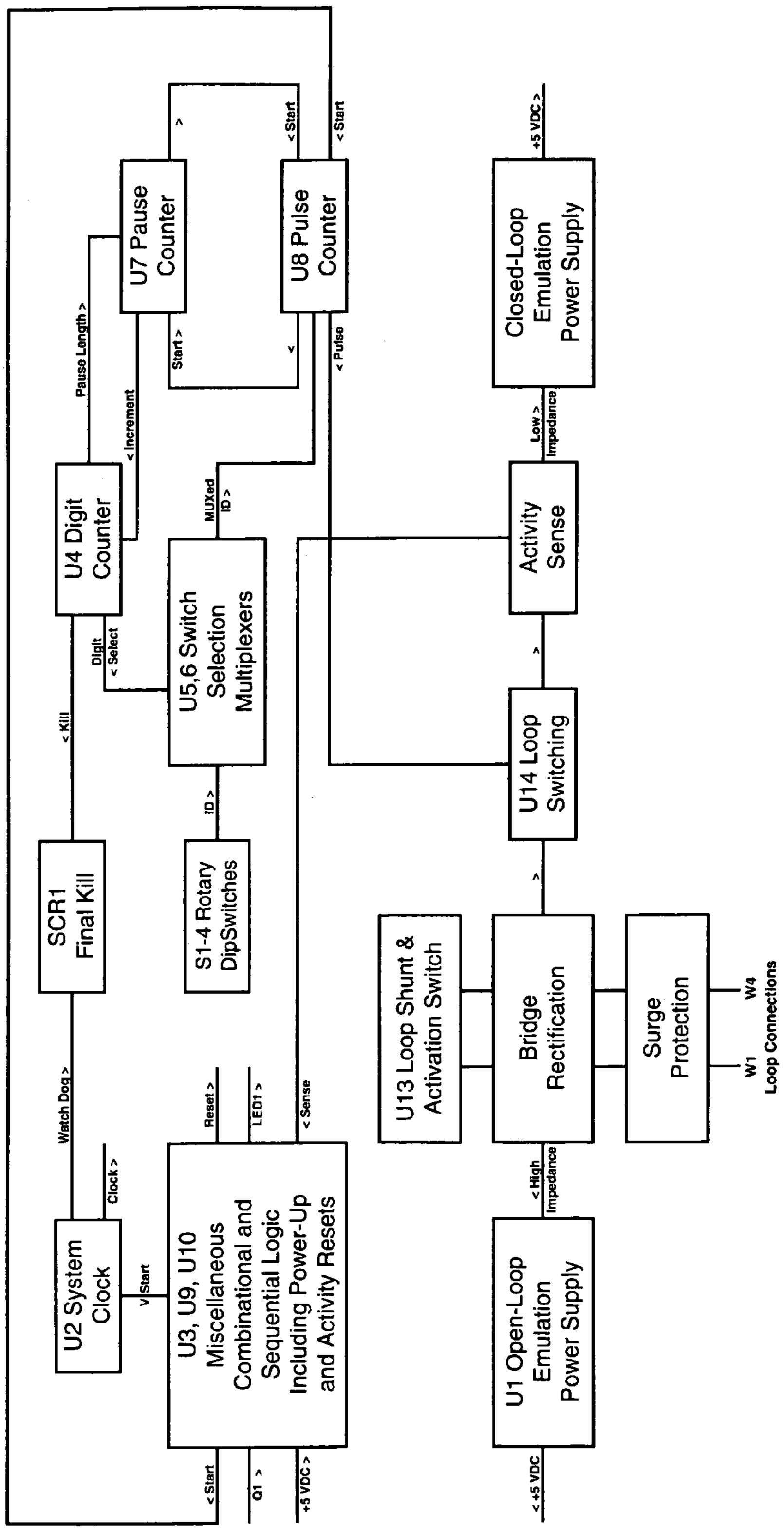
FIG. 4 is a partial, functional block diagram of the solid state, electronic signaling mechanism of the present invention.

Please refer to the top left of the block diagram marked FIG. 4. The system clock provides:

1) standard logic clocking for the entire module, 2) a "start" signal when sufficient time has elapsed without activity elsewhere in the loop and 3) a "watchdog" signal to shut down the module in the event of an internal hang-up.

The final kill circuit shuts down module operation by short circuiting the outputs of both power supplies. Normally, it does this upon receiving a signal from the digit counter, U4, which indicates that ID transmission has ended successfully. Abnormally, it would do this based on the "watchdog" signal from the system clock, U2, indicating that module operation must end, restoring the loop to its closed state, because the ID transmission phase has exceeded its maximum length of 512 clock cycles.

Please refer to the top right of the block diagram marked FIG. 4. Upon receiving a "start" signal, the pulse counter, U8, begins to send to the loop switching circuit, U14, the digit presented to it by the switch selection multiplexers, U5 and U6. Upon completing the first digit, the pulse counter, U8, "starts" the pause counter, U7, which provides the first "inter digit" pause. Upon completing this pause, the pause counter increments the digit counter, U4, and again "starts" the pulse counter, U8. Because the switch selection multiplexers, U5 and U6, are controlled by the digit counter, U4, via the "digit select" lines, C and D, in FIGS. 2A and 2B, the BCD output of the second rotary dipswitch, S2, is now presented to the pulse counter, U8. This process repeats until all four digits of the unit's ID are sent. At this point Q2 and Q1, the two least significant outputs of the digit counter, U4, increment back to 0, causing the switch selection multiplexers, U5 and U6, to again present the first digit of the ID to the pulse counter, U8. However, the circuit logic is configured so that a "pause length" of 4 rather than 1 is preloaded into the pause counter, U7, when Q2 and Q1 both equal 0. This provides a longer pause between ID repetitions than between individual digits within an ID. After this longer "inter ID" pause, the unit goes on to repeat the full ID three more times.

After the transmission of four complete code cycles, Q5 of the digit counter, U4, provides a "kill" signal to the final kill circuit, SCR1, which ends module operation by discharging all operating power from both power supplies.

Modifications to the above circuitry will now be apparent to those skilled in the art. The breadth of the present invention is not to be construed as restricted to the exact schematic, parts list and description presented, but rather as defined by the claims that follow.

What is claimed is:

1. An electronic signaling device for transmitting an ID unique to said signaling device when said signaling device is activated from a quiescent state to an active state, said signaling device adapted for placement in a loop circuit wherein the loop circuit has a predetermined loop current and voltage, the loop circuit including means for transmitting to a remote location an indication of the periodic interruption of the flow of the predetermined loop current in the loop circuit at least when said electronic signaling device is transmitting its unique ID, whereby responsive to the periodic interruption of the flow of predetermined loop current being a function of the electronic signaling device's ID, the remote location including means responsive to said indication can identify the particular electronic signaling device resulting in the periodic interruption of the flow of the predetermined loop current, the electronic signaling device comprising:

(a) activation circuit means responsive to the activation of said electronic signaling device by an operator;

(b) closed-loop emulation power supply circuit means for powering said electronic signaling device when there is no interruption of the loop current, said closed-loop emulation power supply circuit means powered by said predetermined loop current and voltage;

(c) open-loop emulation power supply circuit means for powering said electronic signaling device after said activation responsive circuit means is activated by an operator, and when there is an interruption of the loop current, said open-loop emulation power supply circuit means powered by said predetermined loop current and voltage;

(d) activity sensing circuit means for monitoring whether the interruption of the flow of the loop current is due to an activity occurring elsewhere in the loop and not the result of the activation of said electronic signaling device by an operator;

(e) system clock circuit means responsive to said activity sensing circuit means whereby said system clock circuit means begins to control the transmission of the unique ID of said electronic signaling device in response to a start signal occurring after said activity sensing circuit means determines that the interruption of the flow of the loop current elsewhere in the loop has not occurred for a predetermined first period of time;

(f) means for setting individual digits of said unique ID for said electronic signaling device, said unique ID comprising at least two individual digits of respective value;

(g) circuit means adapted to interrogate said means for setting said unique ID to successively determine each of said at least two digits;

(h) loop switching circuit means responsive to said circuit means adapted to interrogate, whereby the loop circuit is sequentially opened and closed such that the loop current is interrupted or not, said sequential opening and closing of the loop circuit proportionally representative of the respective values of said at least two individual digits;

(i) first pause circuit means adapted to introduce a first time interval between the successive determination of each of said at least two digits, whereby the respective value of each of said at least two digits can be distinguished by the remote location; and, (j) circuit shut down means adapted to respond to a determination that the electronic signaling device has ended the transmission of its unique ID, whereby said circuit shut down means returns said electronic signaling device to the quiescent state.

2. The electronic signaling device claimed in claim 1 further comprising second pause circuit means adapted to determine when the electronic signaling device has ended transmitting its unique ID whereby said second pause circuit means is adapted to direct said circuit means adapted to interrogate to repeat the interrogation of said means for setting said unique ID at least one additional time.

3. The electronic signaling device claimed in claim 2 wherein said circuit means adapted to interrogate is directed by said second pause circuit means to repeat the interrogation of said means for setting said unique ID two additional times.

4. The electronic signaling device claimed in claim 1 further comprising second circuit shut down means adapted to return said electronic signaling device to the quiescent state after an extended time delay of predetermined length, said extended time delay indicative of an abnormal event occurring in said electronic signaling device.

5. A signaling system comprising two or more signaling devices, at least one of which of said two or more signaling devices is an electronic signaling device, each of said two or more signaling devices adapted to transmit an ID unique to each said signaling device when said signaling device is activated from a quiescent state to an active state, each said signaling device adapted for placement in a loop circuit wherein the loop circuit has a predetermined loop current and voltage, the loop circuit including means for transmitting to a remote location an indication of the periodic interruption of the flow of the predetermined loop current in the loop circuit at least when each of said signaling devices is transmitting its unique ID, whereby responsive to the periodic interruption of the flow of predetermined loop current being a function of the signaling device's ID, the remote location including means responsive to said indication, can identify the particular signaling device resulting in the periodic interruption of the flow of the predetermined loop current, each of said at least one electronic signaling device comprising:

(a) activation circuit means responsive to the activation of said electronic signaling device by an operator;

(b) closed-loop emulation power supply circuit means for powering each said electronic signaling device when there is no interruption of the loop current, said closed-loop emulation power supply circuit means powered by said predetermined loop current and voltage;

(c) open-loop emulation power supply circuit means for powering each said electronic signaling device after said activation responsive circuit means is activated by an operator, and when there is an interruption of the loop current, said open-loop emulation power supply circuit means powered by said predetermined loop current and voltage;

(d) activity sensing circuit means for monitoring whether the interruption of the flow of the loop current is due to an activity occurring elsewhere in the loop and not the result of the activation of each said electronic signaling device by an operator;

(e) system clock circuit means responsive to said activity sensing circuit means whereby said system clock circuit means begins to control the transmission of the unique ID of each said electronic signaling device in response to a start signal occurring after said activity sensing circuit means determines that the interruption of the flow of the loop current elsewhere in the loop has not occurred for a predetermined first period of time;

(f) means for setting individual digits of said unique ID for each said electronic signaling device, said unique ID comprising at least two individual digits of respective value;

(g) circuit means adapted to interrogate said means for setting said unique ID to successively determine each of said at least two digits;

(h) loop switching circuit means responsive to said circuit means adapted to interrogate, whereby the loop circuit is sequentially opened and closed such that the loop current is interrupted or not, said sequential opening and closing of the loop circuit proportionally representative of the respective values of said at least two individual digits;

(i) first pause circuit means adapted to introduce a first time interval between the successive determination of each of said at least two digits, whereby the respective value of each of said at least two digits can be distinguished by the remote location; and, (j) circuit shut down means adapted to respond to a determination that each said electronic signaling device has ending the transmission of its unique ID, whereby said circuit shut down means returns each said electronic signaling device to the quiescent state.

6. The signaling system claimed in claim 5 wherein each said electronic signaling device further comprises second pause circuit means adapted to determine when the electronic signaling device has ended transmitting its unique ID whereby said second pause circuit means is adapted to direct said circuit means adapted to interrogate to repeat the interrogation of said means for setting said unique ID at least one additional time.

7. The signaling system claimed in claim 6 wherein said circuit means adapted to interrogate of each said electronic signaling device is directed by said second pause circuit means to repeat the interrogation of said means for setting said unique ID two additional times.

8. The signaling system claimed in claim 5 wherein each said electronic signaling device further comprises second circuit shut down means adapted to return said respective electronic signaling device to the quiescent state after an extended time delay of predetermined length, said extended time delay indicative of an abnormal event occurring in said electronic signaling device.

9. The signaling system claimed in claim 5 wherein at least two or more of said signaling devices are electronic signaling devices and wherein said two or more electronic signaling devices are physically stacked, one upon the other, each of said two or more electronic signaling devices placed in a different, respective loop circuit, and wherein at least all of said stacked electronic signaling devices above the bottom one in the stack, including an uppermost electronic signaling device, includes photo responsive electronic component means, all of said loop circuits to be interrupted if one said loop circuit is interrupted by its respective activated electronic signaling device, the uppermost electronic signaling device providing a visual indication of the interruption of said all of said loop circuits through the cooperative interaction between the photo responsive electronic component means in each adjacent, stacked electronic signaling device.

* * * * *